United States Patent [19]

Evans

[11] 4,400,936
[45] Aug. 30, 1983

[54] METHOD OF PCB DISPOSAL AND APPARATUS THEREFOR

[75] Inventor: Gordon Evans, Lincoln, Canada

[73] Assignee: Chemical Waste Management Ltd., Ontario, Canada

[21] Appl. No.: 219,940

[22] Filed: Dec. 24, 1980

[51] Int. Cl.³ .................. F01N 3/04; F02B 47/00; B01D 53/34
[52] U.S. Cl. .................. 60/274; 60/310; 110/238; 123/1 A; 423/210; 423/212
[58] Field of Search .......... 60/274, 310, 309; 123/1 A; 423/210 C, 212, 240 R, 481; 110/238

[56] References Cited

U.S. PATENT DOCUMENTS

| 2,911,289 | 11/1959 | Forry | 60/310 |
| 3,216,181 | 11/1965 | Carpenter | 60/310 |
| 3,282,047 | 11/1966 | Wertheimer | 60/310 |
| 3,969,482 | 7/1976 | Teller | 423/240 R |
| 4,108,113 | 8/1978 | Timm | 123/1 A |
| 4,125,593 | 11/1978 | Scheifley | 423/210 C |
| 4,154,811 | 5/1979 | Vona | 423/240 |
| 4,223,614 | 9/1980 | Barkhuus | 110/238 |
| 4,246,255 | 1/1981 | Grantham | 423/240 |

FOREIGN PATENT DOCUMENTS 151953  11/1979  Japan .................. 110/238

Primary Examiner—Douglas Hart
Attorney, Agent, or Firm—Antonelli, Terry & Wands

[57] ABSTRACT

A method of disposing safely and efficiently polychlorinated biphenyl (PCB) waste liquids. The PCB liquid is blended with fuel and the mixture is subjected to combustion in a self-contained system. Optionally, hydrochloric acid is recovered from the exhaust gases.

40 Claims, 1 Drawing Figure

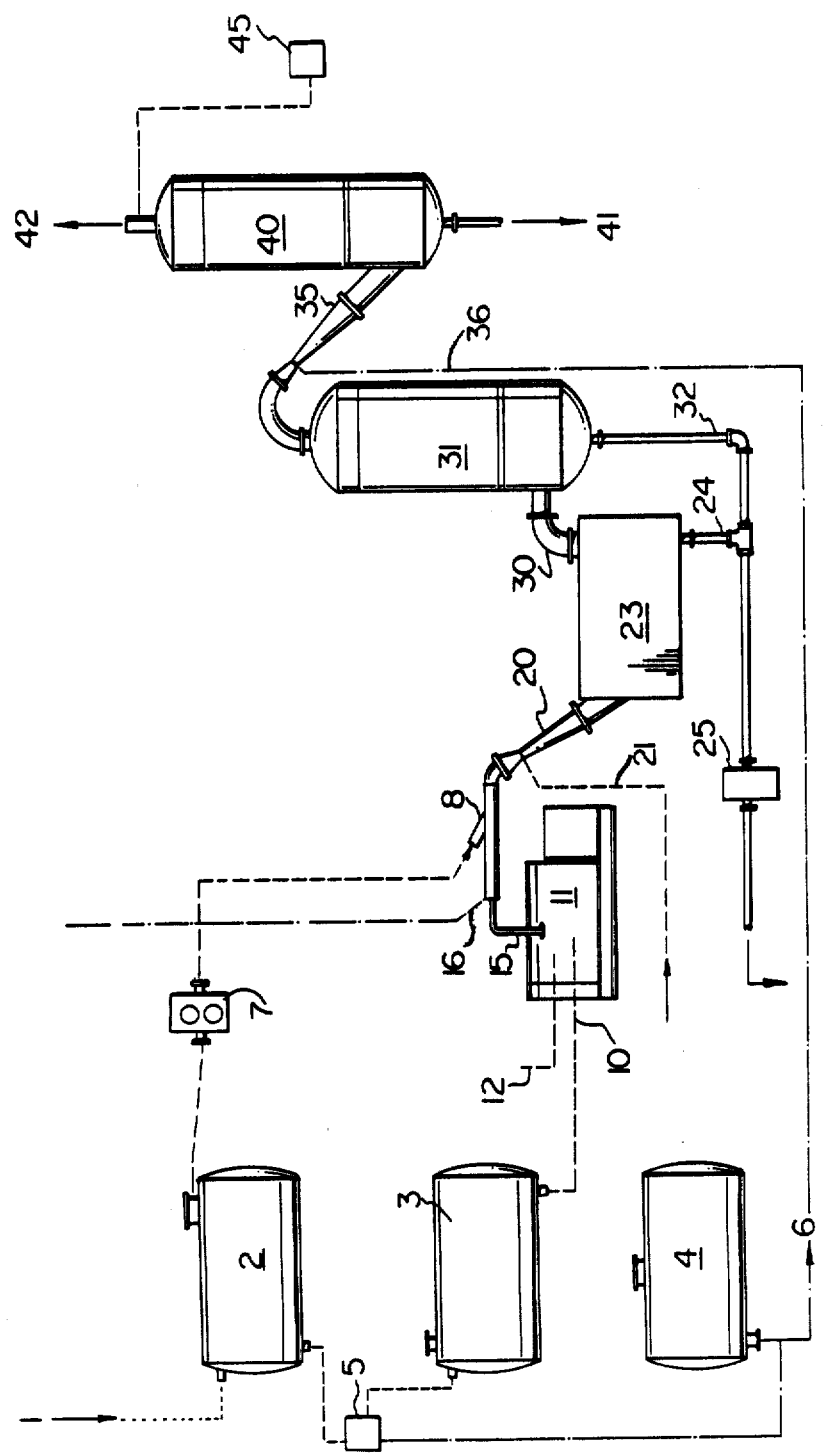

METHOD OF PCB DISPOSAL AND APPARATUS THEREFOR

This invention relates to a method of disposing polychlorinated biphenyl (PCB) waste liquids by combustion of the PCBs with fuel such as diesel oil in a self-contained system.

Safe and efficient disposal of PCB-containing waste and PCB liquids is an ongoing problem, as the widely used PCBs are toxic and difficult to dispose of in a safe and efficient way. Furthermore, it is hazardous to transport such substances from the place where they are used to a site where disposal facilities are available.

Most of the known PCB waste disposal systems destroy PCBs by incineration. Incineration of PCBs, however, requires high temperatures and, therefore, large amounts of fuel. Consequently, the energy consumption of the furnace used for incineration results in very considerable operating costs, particularly, when the heat energy produced by the incinerator cannot be utilized efficiently as is often the case.

A method for treatment of harmful waste vapors derived from chemcial processes is described in U.S. Pat. No. 4,108,113 to Timm. The waste vapors are mixed with air, fed into the combustion chamber of a diesel engine and compressed. Towards the end of the compression stroke fuel is injected into the combustion chamber and the vapor-air-fuel mixture is ignited. On the exhaust stroke the oxidized vapor mixture is discharged into the atmosphere. In order to treat waste liquids such as PCB liquid according to this method, these liquids would have to be vaporized first.

The present invention is designed to avoid these and other disadvantages of the known methods of disposal used for PCB compounds and the like.

It is an object of the present invention to provide a safe and economical method of controlled disposal of PCB liquid and the like by mixing the liquids with fuel, combusting the mixture and scrubbing the exhaust.

It is another object of this invention to provide a self-contained system for disposal of PCBs and the like.

It is a further object of the invention to recover hydrochloric acid from the exhaust gases of the combustion of PCBs and the like.

Further objects and advantages of the invention will become apparent from the following description and claims and from the accompanying drawings.

In one aspect of the invention there is provided an apparatus for disposal of polychlorinated biphenyl (PCB) liquids and the like. The apparatus comprises a substantially air-tight self-contained assembly which includes an internal combustion engine, preferably a diesel engine, for burning of a mixture of PCB liquids and fuel such as diesel oil, and means for processing exhaust gases from the engine. Preferably, the apparatus further includes various fluid pumps. In a preferred embodiment, the power of the engine activates the fluid pumps and generates electricity used in the assembly. The whole self-contained apparatus may, preferably, be mounted on a trailer or automotive unit.

The processing means preferably include at least one gas scrubber, preferably supplied with water, and/or at least one tower with packing material suitable for adsorption of contaminants. The packing material of the tower may be carbon and the like. In a preferred embodiment, the processing means includes at least one gas scrubber supplied with water and at least one gas scrubber supplied with fuel such as diesel oil and the like. The water-supplied gas scrubber may be followed by at least one packed tower which has an inlet for receiving gases from the water-supplied gas scrubber and an outlet for releasing treated gases. The fuel-supplied gas scrubber may be followed by at least one bed with packing material adapted for passage of gases, whereby the bed has an inlet for receiving gases from said fuel-supplied gas scrubber and an outlet for releasing treated gases. In a more preferred embodiment the processing means include at least one gas scrubber supplied with water, a receiving tank which is adapted to be connected to a water-supplied gas scrubber and which has an outlet for gases, and at least one packed tower with an inlet for receiving gases from the receiving tank and an outlet for releasing treated gases. In a most preferred embodiment the processing means further includes at least one gas scrubber supplied with fuel such as diesel oil and the like and adapted to receive exhaust gases from one of the packed towers, and at least one bed with packing material and with an inlet for receiving gases from the fuel-supplied gas scrubber and an outlet for releasing treated gases into the atmosphere. The gas scrubbers may, preferably, be Venturi scrubbers.

In a second aspect of the invention there is provided a method of disposing of PCB liquids and the like which comprises (a) blending PCB liquids and the like with a sufficient amount of fuel such as diesel oil to provide a combustible mixture;

(b) feeding the mixture into a combustion chamber of an internal combustion engine; (c) burning the mixture in said engine and (d) subjecting exhaust gases to at least one processing step so as to remove sufficient contaminants for safe release of the gases into the atmosphere.

In a preferred embodiment the diesel oil is blended with the PCB liquids in a ratio of up to 1:1 by volume. Preferably, the efficiency for destruction of PCB liquids is at least 99%, and the efficiency for destruction and removal of PCB liquids is at least 99.5%, more preferably at least 99.9% or 99.99% and most preferably at least 99.998%.

The processing comprises, preferably, the step of treating the exhaust gases in at least one gas scrubber so as to remove contaminants and/or passing the exhaust gases through at least one tower with packing material such as carbon and the like so as to adsorb contaminants. More preferably, the processing comprises the steps of treating the exhaust gases with water in at least one gas scrubber to remove water-soluble contaminants such as acids and the like and contacting the exhaust gases with fuel such as diesel oil in at least one gas scrubber so as to remove contaminants such as organic substances. Treatment of the exhaust gases with water may be followed by the step of passing the gases through at least one packed tower. Contacting the exhaust gases with fuel may be followed by the step of passing the gases through at least one bed of packing material so as to separate the gases from fuel droplets. In a more preferred embodiment the processing comprises the steps of treating the exhaust gases with water in a gas scrubber and a receiving tank so as to remove water-soluble contaminants such as acids and the like from the exhaust gases and separating the gases from water droplets by passing the gases through a packed tower. In a most preferred embodiment the processing further comprises the steps of contacting the water-treated exhaust gases with fuel such as diesel oil in a gas scrubber so as to remove contaminants such as organic substances from the exhaust gases and separating the gases from fuel droplets by passing the gases through a bed of packing material. The gas scrubbers used are, preferably, Venturi scrubbers.

In the drawing which illustrates by way of example, a particular embodiment of the present invention:

The FIGURE is a diagrammatic view of an embodiment of the invention.

Referring now to the drawing, the PCB waste liquids are pumped from storage tanks, drums, transformers, etc. via intake line 1 into vacuum tank 2 which is part of a self-contained unit. Diesel oil is stored in diesel supply tank 4. A blending pump 5 equipped with flow rate controls pumps PCBs and diesel oil in the desired quantities into blend supply tank 3. The resulting diesel oil-PCB mixture is stable even at a ratio of 1:1 by weight. In low temperature conditions care has to be taken that the temperature of the pre-blended fuel does not drop below about −40° C. Alternatively, the blended fuel can be preheated to reach a temperature of at least −40° C. The blended fuel from tank 3 is then introduced into the combustion chamber of the diesel engine 11 via line 10. The air intake of the engine is supplied via line 12. In adverse weather conditions it is preferable to dry the air prior to introducing it into the engine, so as to prevent accumulation of moisture in the combustion chamber.

Following combustion the exhaust gases leave the engine 11 via line 15. A secondary air supply can be connected to line 15 at 16. To ensure that no PCB vapors can escape into the atmosphere vacuum pump 7 pumps any PCB vapors which may accumulate in tank 2 into the exhaust line at 8. The exhaust gases then pass into a Venturi scrubber 20, where they are contacted with water at 21 to convert the hydrogen chloride contained in the exhaust to hydrochloric acid. The acid accumulates in receiving tank 23. Exhaust gases from tank 23 are passed through line 30 into tower 31 which is filled with packing material suitable for the passage of gases. In the tower acid mist is separated from the exhaust gases. If necessary, the acid eliminating step can be repeated until practically all water soluble exhaust gases have been removed from the gas stream.

To further process the exhaust gases, the gas stream from tower 31 is passed through a Venturi scrubber 35 in which it is contacted at 36 with diesel oil coming from diesel supply tank 4 via line 6. The fuel combines with unburned organic compounds in the exhaust. The resulting contaminated fuel is then separated from the gas stream in packed tower or bed 40. The contaminated fuel collecting in the bottom of the tower 40 is returned to blend supply tank 3 via line 41. The purified exhaust gases from tower 40 are monitored in an exhaust analyzer 45 such as a gas chromatograph. Once the exhaust is found to be safe, it is released into the atmosphere at 42. If required, the extraction with diesel fuel can be repeated.

The acid which collects in receiving tank 23 and in tower 31 is passed via lines 24 and 32, respectively, through a filter unit 25 such as a duplex filter unit made up of a fine mesh screen for the removal of particulate materials and an activated carbon filter to remove organic compounds contained in the acid. The strength of the hydrochloric acid generated in this process can be adjusted by recycling the acid from tank 23 and tower 31 into the Venturi scrubber 20 at 21 prior to filtration and recovery of the acid at 26.

In a self-contained unit of the type shown in the FIGURE the diesel engine 11 supplies the power for all the pumps such as the vacuum pump which transfers the PCB liquids into tank 2 and the PCB vapors into the exhaust at 8; the air supply pump; the blending pump 5 which pumps PCB liquids and the diesel oil into tank 3 and controls the ratio of PCBs to diesel oil; the fuel supply pump; the pump supplying Venturi scrubber 20 with water; the pump for pumping the acid from tank 23 and tower 31 through filter unit 25 and/or for recycling the acid; the pump supplying Venturi scrubber 35 with diesel oil from tank 4; the pump for returning contaminated fuel from tower 40 to tank 3; etc. Furthermore, the power of the diesel engine is used for generating electricity necessary for lights and instrumentation such as for monitoring vacuum, flow rates, pressures, pH-values, emission, etc.

A unit of the kind shown in the FIGURE can be adapted to be mounted on a trailer or an automotive unit such as a flatbed truck. Such a mobile unit can easily be operated at the customer's premises thus avoiding the risks involved in the transportation of PCBs from the locations where the PCBs are accumulated to the place where they can be disposed.

It is also possible to add secondary processes to the basic unit for processing PCBs. Examples of such secondary processes are the flushing out of transformers on site and decontamination and subsequent crushing of drums.

From the foregoing description further modifications and embodiments will be apparent to those skilled in the art, and the embodiments disclosed are intended only to illustrate the invention without limiting the scope therof.

The following examples further illustrate the present invention.

EXAMPLE 1

A 4-cylinder, 240 cubic inch Ford diesel engine was connected to a hydraulic pump feeding fuel to the engine and to an emission control system which consisted of a water scrubber tank, a packed tower and mist eliminator, and a carbon adsorber tower. The engine was run on diesel fuel which was blended with 10%(v/v) of a mixture of 70% PCBs and 30% trichlorobenzene. The engine was operated at 2000 rpm. The engine exhaust gases were sampled before the water scrubber and after the carbon adsorber tower. All collected samples were analyzed for PCBs by pulling exhaust gas through two impingers filled with ice water. A Fluorisil (Trademark) adsorbent trap was placed between an empty third impinger and a fourth impinger containing silica gel to collect residual PCBs passing through the first two impingers. The scrubber water was analyzed for PCBs and inorganic chloride.

PCBs were analyzed in a gas liquid chromatograph with electron capture detector (GLC/EC) or in a Finnigan 4023 (Trademark) GC/MS and high resolution capillary gas chromatograph. The results are shown in Tables I and II, respectively.

PCB emission rates are shown in Table III.

Chloride concentrations were determined using a standard Volhard titration. The results are shown in Table IV.

The volume of fuel burned was 10.8 liters/hr. The PCB feed rate to the engine was 1284 g/hr, the PCB emission rate at the scrubber inlet, which corresponded to the engine emission rate, was 7.76 g/hr (see Table III). The engine efficiency for PCB destruction was, therefore, 99.4%. The PCB emission rate after carbon adsorber was 0.0025 g/hr (see Table III). The efficiency of the entire exhaust control system was, therefore, 99.97%.

The amount of PCB collected in the scrubber was 3.6 g/hr and, thus, the scrubber removal efficiency was about 47%. The amount of PCB passing to the adsorber was 4.1 g/hr and the adsorber efficiency rate for PCB removal was, therefore, 99.94%.

An assessment of the chloride concentration in the scrubber water, compared with that predicted for a complete breakdown of PCBs to $CO_2$ and HCl, indicated that approximately 50% of the PCBs and trichlorobenzene in the fuel were oxidized to HCl. This indicated that a portion of the chlorinated material degraded to lower molecular weight organic chlorides.

Extensive GC/MS analysis showed that besides PCB minor amounts of mono-, di- and trichlorobenzenes were present in the exhaust, but no dioxins or dibenzofurans were detected.

TABLE I

PCB content of samples analyzed in a Gas Liquid Chromatograph with Electron Capture Detector

| Sample | *PCB Concentration mg/ml | PCB Collected mg |
|---|---|---|
| Diesel Fuel Sample | 134 | — |
| Scrubber Inlet Impinger Solution | | 9.58 |
| Fluorisil Trap | | 18.14 |
| Carbon Adsorber Outlet Fluorisil Trap | | 0.00912 |
| Scrubber Water Before | 0.00021 | — |
| After | 0.063 | — |

*Aroclor 1254 was used as the PCB reference

TABLE II

PCB Content of Samples analyzed in a Finnigan 4023 GC/MS and High Resolution Capillary Gas Chromatograph

| Sample | PCB Concentration mg/ml | PCB Collected mg |
|---|---|---|
| Diesel Fuel Sample | 137 | |
| Scrubber Inlet Impinger Solution | 0.171 | 17.86 |
| Fluorisil Trap | 0.117 | 21.6 |
| Carbon Adsorber Outlet Fluorisil Trap | 0.00008 | 0.0144 |
| Scrubber Water Before | 0.00011 | 0.172 |
| After | 0.068 | 98.4 |

TABLE III

PCB Concentrations and Emission Rates

| Location | Gas Volume Sampled m³ (standard) | Volume Flowrate (dry standard) m³/hr | *PCB Collected | PCB Concentration mg/m³ | PCB Emission Rate g/hr |
|---|---|---|---|---|---|
| Scrubber Inlet | 0.887 | 245.2 | 27.72 mg | 31.7 | 7.76 |
| Adsorber Outlet | 0.889 | 245.2 | 9.12 μg | 0.0103 | 0.0025 |

*Data from Table I

TABLE IV

Chloride Ion Analyses

| Sample | Chloride Concentration Mg/L |
|---|---|
| Scrubber Inlet Impinger Solution | 4010 |

TABLE IV-continued

Chloride Ion Analyses

| Sample | Chloride Concentration Mg/L |
|---|---|
| Scrubber Water Before | <15 |
| After | 8490 |

I claim:

1. An apparatus for disposal of polychlorinated biphenyl (PCB) liquids and the like, said apparatus comprising a substantially air-tight self-contained assembly which includes:
   (a) an internal combustion engine for burning of a mixture of PCB liquids, fuel and air; and
   (b) means for processing exhaust gases from the engine, said means including:
      (i) at least one gas scrubber being supplied with water; and
      (ii) at least one gas scrubber being supplied with fuel.

2. An apparatus as in claim 1 wherein the processing means further includes at least one tower with packing material which is adapted for passage of gases, for receiving gases from said water-supplied gas scrubber.

3. An apparatus as in claim 1 wherein the processing means further includes at least one bed with packing material which is adapted for passage of gases, for receiving gases from said fuel-supplied gas scrubber.

4. An apparatus as in claim 1 wherein the processing means includes
   a receiving tank connected to said at least one water-supplied gas scrubber for receiving aqueous solution and gas therefrom; and
   at least one tower with packing material which is adapted for passage of gases, for receiving gases from said receiving tank.

5. An apparatus as in claim 4 wherein the processing means further includes
   exhaust gases from that at least one tower; and
   at least one bed with packing material which is adapted for passage of gases,, for receiving gases from said fuel-supplied gas scrubber.

6. An apparatus as in claim 4 or 5 wherein the gas scrubbers are Venturi scrubbers.

7. An apparatus as in claim 1 which further comprises various fluid pumps.

8. An apparatus as in claim 7 wherein power of said engine activates said fluid pumps and generates electricity for use in said assembly.

9. An apparatus as in claim 1 wherein said engine is a diesel engine and the fuel is diesel fuel.

10. An apparatus as in claim 1, 5 or 8, wherein said assembly is adapted to be mounted on a trailer or automotive unit.

11. A method of disposing of polychlorinated biphenyl (PCB) liquids and the like which comprises:
   (a) blending the PCB liquids with a sufficient amount of fuel to provide a combustible mixture;
   (b) feeding the mixture and air into a combustion chamber of an internal combustion engine; p1 (c) burning the mixture in said engine; and
   (d) subjecting exhaust gases formed in said burning to processing steps so as to remove sufficient contaminants for safe release of the gases into the atmosphere, said processing steps including:

(i) treating the exhaust gases with water in at least one gas scrubber to remove water-soluble contaminants; and (ii) contacting the exhaust gases with fuel in at least one gas scrubber so as to remove contaminants such as organic substances from the exhaust gases.

12. A method as in claim 11 wherein the processing steps further include separating the gases treated with water from water droplets and other contaminants by passing the gases through at least one packed tower.

13. A method as in claim 11 wherein the processing steps further include separating the gases treated with fuel from fuel droplets by passing the gases through at least one bed of packing material.

14. A method as in claim 11 wherein the processing step (i) comprises treating the exhaust gases with water in a gas scrubber and a receiving tank so as to remove water-soluble contaminants, such as hydrochloric acid, from the exhaust gases, and separating the gases from water droplets by pasing the gases through a tower containing packing material.

15. A method as in claim 8 wherein the processing step (ii) comprises contacting the water-treated exhaust gases with fuel in a gas scrubber so as to remove contaminants, such as organic substances, from the exhaust gases, and separating the gases from fuel droplets by passing the gases through a bed of packing material.

16. An apparatus for disposal of polychlorinated biphenyl (PCB) liquids and the like, said apparatus comprising a substantially air-tight self-contained assembly which includes:

(a) an internal combustion engine for burning of a mixture of PCB liquids, fuel and air; and (b) means for processing exhaust gases from the engine, including:

(i) at least one gas scrubber being supplied with water; and (ii) at least one adsorber tower with packing material which is adapted for the passage of gases and which is suitable for adsorption of organic contaminants.

17. An apparatus as in claim 16 wherein the packing material in said adsorber tower is activated carbon.

18. A method of disposing of polychlorinated biphenyl (PCB) liquids and the like which comprises:

(a) blending the PCB liquids with a sufficient amount of fuel to provide a combustible mixture;

(b) feeding the mixture and air into a combustion chamber of an internal combustion engine;

(c) burning the mixture in said engine; and (d) subjecting exhaust gases formed in said burning to processing steps so as to remove sufficient contaminants for safe release of the gases into the atmosphere, said steps including:

(i) treating the exhaust gases with water in at least one gas scrubber to remove water-soluble contaminants; and (ii) passing the exhaust gases through at least one adsorber tower to adsorb organic contaminants.

19. A method as in claim 11 wherein the engine is a diesel engine and the fuel is diesel fuel.

20. A method as in claim 11 wherein the diesel oil is blended with the PCB liquids in a ratio of up to about 1:1 by volume.

21. A method as in claim 18 wherein the exhaust gases are passed through an adsorber tower packed with activated carbon.

22. A method as in claim 18 or 19 having an efficiency for destruction of PCB liquids of at least 99%.

23. A method as in claim 11 or 15 having an efficiency for destruction and removal of PCB liquids of at least 99.5%.

24. A method as in claim 11, 15 or 21 having an efficiency for destruction and removal of PCB liquids of at least 99.9%.

25. A method as in claim 11 or 15 having an efficiency for destruction and removal of PCB liquids of at least 99.99%.

26. A method as in claim 16, 15 or 19 having an efficiency for destruction and removal of PCB liquids of at least 99.998%.

27. A method of disposing of polychlorinated biphenyl (PCB) liquids and the like which comprises:

(a) blending the liquids with a sufficient amount of diesel fuel to provide a combustible mixture;

(b) feeding the mixture and air into a combustion chamber of a diesel engine;

(c) burning the mixture in said engine; and (d) subjecting exhaust gases to processing steps so as to remove sufficient contaminants for safe release of the gases into the atmosphere, said processing steps including:

(i) treating the exhaust gases with water in at least one gas scrubber to remove hydrochloric acid and other water-soluble contaminants from the exhaust gases;

(ii) passing gases and aqueous solution from the water-supplied gas scrubber into a receiving tank;

(iii) separating the gases emerging from the receiving tank from water droplets by passing the gases through at least one packed tower;

(iv) contacting the water-treated gases with diesel fuel in at least one gas scrubber to remove fuel-soluble contaminants; and (v) separating the fuel-treated gases from fuel droplets by passing the gases through at least one bed of packing material.

28. A method as in claim 14 or 27 further including the step of recovering hydrochloric acid from aqueous effluent from said receiving tank.

29. A method as in claim 12, 14 or 27 wherein aqueous solution separated from the gases in said packed tower is combined with aqueous effluent from said receiving tank for recovery of hydrochloric acid.

30. A method as in claim 13, 15 or 27 wherein spent fuel from said fuel-supplied scrubber and fuel separated from the gases in said bed are recycled for blending with PCB liquids.

31. A method of disposing of polychlorinated biphenyl (PCB) liquids and the like which comprises:

(a) blending the liquids with a sufficient amount of diesel fuel to provide a combustible mixture;

(b) feeding the mixture and air into a combustion chamber of a diesel engine;

(c) burning the mixture in said engine; and (d) subjecting exhaust gases to processing steps so as to remove sufficient contaminants for safe release of the gases into the atmosphere, said processing steps including:

(i) treating the exhaust gases with water in at least one gas scrubber to remove hydrochloric acid and other water-soluble contaminants from the exhaust gases;

(ii) separating the water-treated gases from water droplets by passing the gases through at least one packed tower; and (iii) passing the gases emerging from said at least one packed tower through activated carbon in at least one adsorber tower to adsorb organic contaminants.

32. An apparatus for disposal of polychlorinated biphenyl (PCB) liquids and the like, said apparatus comprising a substantially air-tight self-contained assembly which includes:

(a) means for blending PCB liquids with diesel fuel;

(b) at least one diesel engine for burning of a mixture of PCB liquids, diesel fuel and air; and (c) means for processing exhaust gases from the engine including:

(i) at least one gas scrubber supplied with water for removal from the exhaust gases of watersoluble contaminants;

(ii) a receiving tank connected to said watersupplied gas scrubber for receiving aqueous solution and gases therefrom;

(iii) at least one tower with packing material, which is adapted for passage of gases, connected to said receiving tank for receiving gases therefrom and having an outlet for releasing treated gases and a second outlet for separated aqueous solution;

(iv) at least one gas scrubber connected to said tower for receiving treated gases therefrom, said gas scrubber being supplied with diesel fuel for removing from the gases fuel-soluble contaminants; and (v) at least one bed with packing material, which is adapted for passage of gases, connected to said fuel-supplied gas scrubber for receiving gases therefrom and having an outlet for releasing treated gases into the atmosphere and a second outlet for spent fuel.

33. An apparatus as in claim 32 further including means for recycling spent fuel from said fuel-supplied scrubber and from said bed to said blending means.

34. An apparatus as in claim 33 further including means for combining the separated aqueous solution from said tower with aqueous solution from said receiving tank.

35. An apparatus as in claim 4, 5 or 32 further including a filter unit connected to said receiving tank for filtering the aqueous solution leaving the receiving tank.

36. An apparatus for disposal of polychlorinated biphenyl (PCB) liquids and the like, said apparatus which includes:

(a) means for blending PCB liquids with diesel fuel;

(b) at least one diesel engine for burning of a mixture of a mixture of PCB liquids, diesel fuel and air; and (c) means for processing exhaust gases from the engine including:

(i) at least one gas scrubber supplied with water for removal from the exhaust gases of watersoluble contaminants;

(ii) at least one separating tower with packing material, which is adapted for passage of gases, connected to said water-supplied gas scrubber for receiving gases therefrom and having an outlet for releasing treated gases and a second outlet for separated aqueous solution; and (iii) at least one activated carbon containing adsorber tower for adsorbing organic contaminants in gases emerging from said separating tower, said adsorber tower releasing treated gases into the atmosphere.

37. An apparatus as in claim 32 or 36 further comprising control means for controlling exhaust gas composition.

38. An apparatus as in claim 32 or 36 which further comprises various fluid pumps and lines.

39. An apparatus as in claim 32 or 36 wherein substantially all power required in said assembly is provided by said diesel engine.

40. An apparatus as in claim 32 or 36 wherein said apparatus is mounted on a trailer or automotive unit.

* * * * *